US005411715A

United States Patent [19]

Czekai et al.

[11] Patent Number: 5,411,715

[45] Date of Patent: May 2, 1995

[54] APPARATUS FOR PREPARING AQUEOUS AMORPHOUS PARTICLE DISPERSIONS OF HIGH-MELTING MICROCRYSTALLINE SOLIDS

[75] Inventors: David A. Czekai, Honeoye Falls; John F. Bishop, Rochester, both of N.Y.

[73] Assignee: Eastman Kodak Company, Rochester, N.Y.

[21] Appl. No.: 140,703

[22] Filed: Oct. 21, 1993

Related U.S. Application Data

[63] Continuation of Ser. No. 896,069, Jun. 9, 1992, abandoned.

[51] Int. Cl.[6] .................... B01D 8/00

[52] U.S. Cl. .................... 422/243; 165/65; 165/66; 430/569

[58] Field of Search .................... 422/243; 430/569; 165/65, 66; 23/293 R; 252/314

[56] References Cited

U.S. PATENT DOCUMENTS

| | | | |
|---|---|---|---|
| 3,699,779 | 10/1972 | Schlichtig | 62/467 |
| 3,810,778 | 5/1974 | Wang | 117/34 |
| 3,850,643 | 11/1974 | Johnson et al. | 96/100 |
| 3,888,465 | 6/1975 | Terwilliger et al. | 165/65 |
| 4,051,278 | 9/1977 | Democh | 427/326 |
| 4,051,814 | 10/1977 | Jennings | 122/448.1 |
| 4,147,551 | 4/1979 | Finnicum et al. | 96/94 R |
| 4,171,224 | 10/1979 | Verhille et al. | 96/96 |
| 4,242,445 | 12/1980 | Saito | 430/569 |
| 4,247,627 | 1/1981 | Chen | 430/512 |
| 4,251,627 | 2/1981 | Calamur | 430/569 |
| 4,334,012 | 6/1982 | Mignot | 430/567 |
| 4,336,328 | 6/1982 | Brown et al. | 430/569 |
| 4,367,699 | 1/1983 | Evans | 165/47 |
| 4,368,258 | 1/1983 | Fujiwhara et al. | 430/493 |
| 4,378,425 | 3/1983 | Schnoring et al. | 430/377 |
| 4,539,290 | 9/1985 | Mumaw | 430/569 |
| 4,637,936 | 1/1987 | White et al. | 165/65 |
| 4,758,505 | 7/1988 | Hoffmann | 430/569 |
| 4,879,208 | 11/1989 | Urabe | 430/569 |
| 4,900,542 | 2/1990 | Parrotta, Jr. et al. | 424/66 |
| 4,980,085 | 12/1990 | Straw et al. | 252/314 |
| 4,983,319 | 1/1991 | Gregoli et al. | 252/314 |
| 5,080,164 | 1/1992 | Hermans | 165/66 |
| 5,110,717 | 5/1992 | Czekai et al. | 430/512 |
| 5,147,412 | 9/1992 | Klinksiek et al. | 23/293 R |

FOREIGN PATENT DOCUMENTS 2205864 8/1972 Germany .

*Primary Examiner*—W. Gary Jones
*Assistant Examiner*—Laura E. Edwards
*Attorney, Agent, or Firm*—Paul A. Leipold

[57] ABSTRACT

An apparatus for producing amorphous particle dispersions of high-melting microcrystalline solids in a continuous process. The apparatus comprises a pump, two heat exchangers, a back-pressure valve and conduits connecting them, whereby it is possible to make aqueous dispersions of particles whose melting points are above 100° C.

10 Claims, 2 Drawing Sheets

APPARATUS FOR PREPARING AQUEOUS AMORPHOUS PARTICLE DISPERSIONS OF HIGH-MELTING MICROCRYSTALLINE SOLIDS

The current application is a continuation of prior application Ser. No. 07/896,069, filed on Jun. 9, 1992, now abandoned.

FIELD OF THE INVENTION

The invention relates to an apparatus for producing amorphous particle dispersions in a continuous process. More particularly the apparatus provides a means for heating a microcrystalline dispersion above its melting point in a solvent having a boiling point below the melting point of the solid.

BACKGROUND

The preparation of fine particle systems such as solid-in-liquid dispersions can be carried out by a wide variety of processes including grinding, homogenization, and precipitation. Amorphous particle-in-liquid systems are usually prepared by incorporating an amorphous dispersed phase into a liquid continuous phase under high shear mixing or homogenization.

In certain applications, such as with photographic dispersions, crystalline materials such as dye-forming couplers, oxidized developer scavengers, and various dyes are dissolved in organic solvents at high temperatures and emulsified in aqueous gelatin solutions. Submicron amorphous particles in such dispersions are found to be metastable and will eventually recrystallize in the aqueous system unless coated and dried on photographic support, in which state they are stable against recrystallization.

Recrystallization of the dispersed particles prior to coating reduces dispersion efficacy and is generally undesirable. In addition, crystallization of the UV absorber after coating may lead to delamination of layers, haze, reduced maximum density, stain, and sensimetric problems.

U.S. Pat. No. 5,110,717, which is incorporated herein by reference, describes an improved process for making amorphous fine-particle dispersions. The process comprises mechanically grinding a crystalline material to a desired particle size in a liquid that is not a solvent for the crystalline material, heating the crystalline particles dispersed in the liquid to above their melting temperature, and cooling the melted particles in the liquid to form amorphous particles. In preferred forms of the invention discussed in the patent, the crystalline materials are photographically useful materials, such as ultraviolet light absorbers and couplers. The dispersions formed by the process are more storage stable and the particles formed are smaller than those formed in other emulsification processes. Small particle size provides more effective UV control for a given amount of UV absorber and allows the use of less silver and less gelatin in film layer formation. Finer UV absorbing compounds give better images in photographic products, as there is less light scattering and better UV absorption for a given amount of material in the product.

In the process described in U.S. Pat. No. 5,110,717, crystalline material and a nonsolvent liquid are added to a media mill. The media mill operates to reduce the crystalline material to the desired size, after which it is passed through a filter and placed in a mixing vat where the liquid to particle ratio may be adjusted. The nonsolvent for the material of the examples is water. The milling and mixing are carried out at about room temperature. The slurry of particles may be either transferred to storage or directly to a subsurface addition device for combination with a gelatin and water solution in a tank. After mixing crystalline material with the gelatin water solution, it is passed from the tank to an inline heater. At the inline heater, the crystalline material is heated to above its melting temperature, typically 75° to 99° C. After heating the material is immediately cooled in an inline cooling section to 40° C. and then immediately coated.

In the apparatus schematically shown in the patent, microcrystalline materials with melting points below 100° C. are converted to approximately spherical amorphous particles in an aqueous dispersion. However, the apparatus shown could not be used to carry out the otherwise attractive process when the microcrystalline material has a melting point above 100° C. and the nonsolvent carrier is water.

There is thus a need for an apparatus for preparing an amorphous particle dispersion in water when the material from which the amorphous particle is formed melts above 100° C.

SUMMARY OF THE INVENTION

It is an object of the invention to provide an apparatus for preparing an amorphous particle dispersion in water when the material from which the amorphous particle is formed melts above 100° C.

It is a further object to provide an apparatus that prepares such dispersions in a continuous, rather than batch-wise process.

It is a further object to provide an apparatus for preparing, by a continuous process, an amorphous particle dispersion in any nonsolvent carrier whose boiling point is below the melting point of the material from which the amorphous particle is formed.

These and other objects are achieved by the present invention, which in one aspect comprises an apparatus for forming amorphous particle dispersions in a fluid at elevated temperatures and elevated pressure in a continuous process comprising:

(a) pump means capable of pumping a fluid against pressure higher than atmospheric pressure;

(b) a first heat exchange device for supplying sufficient heat to raise the temperature of the fluid above its boiling point at atmospheric pressure;

(c) a second heat exchange device for removing heat from the fluid to lower the temperature of the fluid from above its boiling point at atmospheric pressure to below its boiling point at atmospheric pressure;

(d) means for generating back-pressure sufficient to maintain the fluid in a liquid state at the temperature of the first heat exchange device; and (e) a conduit for delivering said fluid from the pump to the first heat exchange device, from the first heat exchange device to the second heat exchange device, and from the second heat exchange device to the back-pressure generating means.

The apparatus may also include pulse dampening means disposed downstream of the pump.

In a preferred embodiment the fluid is water, the temperature of the first heat exchange device is from 100° C. to 200° C., the second heat exchange device is below 100° C. and the pressure is maintained between 1.0 and 18 atmospheres. The preferred pump is a diaphragm pump and the preferred means for generating back-pressure is a spring-loaded backpressure valve. The temperature of the second heat exchanger is in most instances such as to lower the temperature of the heated fluid below the glass transition temperature of the particles.

DESCRIPTION OF PREFERRED EMBODIMENTS

In practice, high pressure heating may be accomplished by either a batch or continuous approach. A batch process may include charging aqueous dispersion in a sealed pressure vessel and heating by an electric mantle until the dispersion temperature reaches the crystal melting point. The dispersion is then cooled by immersing the vessel in chilled water.

Example 1 shows dispersion particle size before and after thermal modification in a batch process for three heating rates.

EXAMPLE 1 (cyan coupler dispersion, initial particle size 0.28 μm mp=150 C.)

| Sample | Size after heating (μm) | Heat Rate (°C./min) | Cool Rate (°C./Min) |
|---|---|---|---|
| 1 | 0.29 | 20 | 50 |
| 2 | 0.32 | 10 | 50 |
| 3 | 0.35 | 5 | 50 |

Particle size increases by ripening and coalescence during exposure to elevated temperature. As a result, the undesirable enlargement of particles increases with decreasing rate of temperature change. Also, the lack of mixing during heating and cooling reduces heat transfer and the rate of temperature change.

A continuous process increases heating and cooling rates and thereby minimizes particle growth. Approaches that were initially considered for providing in-line pressurized heating include pumping through heat exchangers against a pressure head provided by flow restriction devices such as tube constrictions, nozzles or orifices. Two problems are encountered with these approaches:

(1) Flow rate (and therefore heating rate) is coupled with pressure. Flow and pressure cannot be separately modulated since higher flow rates are required to achieve higher pressures. The coupling of flow rate and pressure makes it difficult to control a process when materials with different melting points are to be processed in common equipment.

(2) During start-up, vaporization can occur since an orifice will allow generated vapor to escape. This can result in fouling of tubing and particle coalescence.

To overcome these problems an apparatus is provided by the invention wherein flow rate and pressure are regulated independently, and fast heating and cooling rates are obtained, thereby improving process control and product quality.

Figure 1:
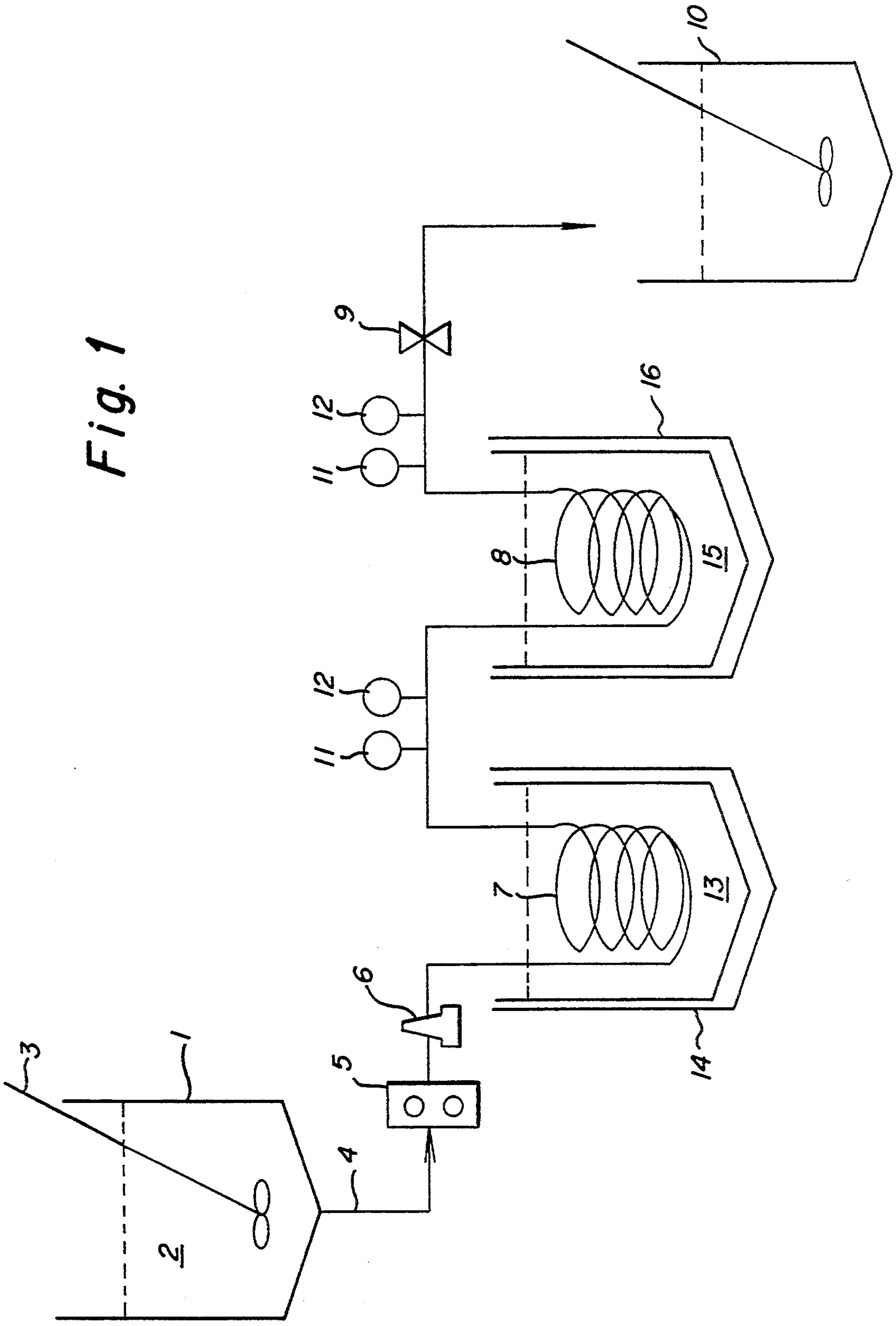
FIG. 1 is a schematic of an apparatus according to the invention.

FIG. 1 shows a vessel (1) containing a mixture of microcrystalline photographically active material in water (2) and a suitable means (3) for continuously agitating and mixing the contents of the vessel. A conduit (4) feeds the mixture to a positive displacement pump (5) and thence through an optional pulse dampener (6), a first heat exchange coil (7), a second heat exchange coil (8) and a backpressure valve (9). In the embodiment shown the resulting amorphous particle dispersion is fed into a storage vessel (10), where it is maintained at a temperature of the particles until needed. Other embodiments allow the immediate addition of the usual additives and directly coating the resulting composition onto a substrate. Temperature and pressure are monitored by temperature gauges (11) and pressure gauges (12). First heat exchange coil (7) is immersed in a suitable fluid (13), in a jacketed vessel (14); the heating fluid (13) is usually a silicone oil at 100° to 250° C. when the nonsolvent, dispersion fluid is water. The second heat exchange coil (8) is similarly immersed in a suitable fluid (15) in a jacketed vessel (16); the cooling fluid (15) is typically water at 0° to 25° C. Heating and cooling of the vessels are achieved by means (not shown) well-known in the art.

Positive displacement pumps are preferred, since high pressures can be obtained without changing flow rate. By contrast, centrifugal pumps require high flow to generate high pressure. Examples of positive pressure pumps suitable for use in the apparatus of the invention include (1) diaphragm pumps, (2) gear pumps, (3) progressive cavity pumps, and (4) peristaltic pumps.

Each of these can deliver high accuracy, low flow and high pressure. The diaphragm pump is preferred since wetted parts can be sanitary thereby minimizing contamination by contact with solution. Also, diaphragm pumps allow less fluid slippage at high pressure. An example of such a pump is Milton Roy Diaphragm Model R131-117 which delivers 80 L per hour at 24 atm and is adjustable from 8 to 80 L per hour.

The use of a pulsation dampener is advantageous because process flow control is improved and equipment wear is reduced. An example is Milton Roy Model PR-010-1E.

Back pressure valves are commonly used to prevent siphoning in metering pump systems where the pump discharge pressure is lower than the pressure at the pump inlet. A back pressure valve maintains a discharge head on the pump that is greater than the suction or inlet pressure. Valves are commercially available for flow rates to 1750 L per hour and pressures to 14 $kgf/cm^2$.

Figure 2:
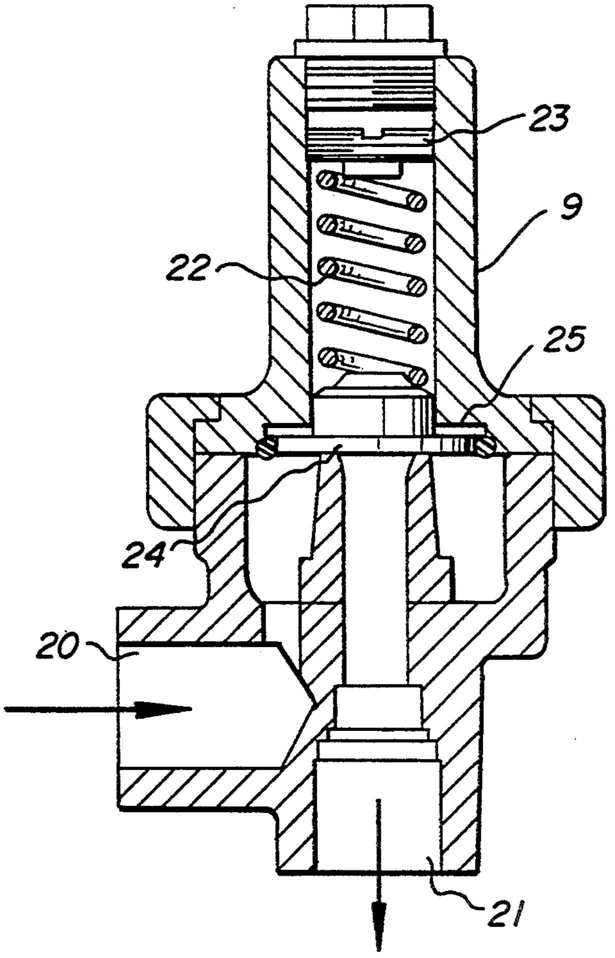
FIG. 2 is a cross-section of a back pressure valve suitable for use in the invention.

Preferred valves have TFE diaphragms to protect the upper body mechanisms from contact with process liquid. A typical back-pressure valve (9) particularly suitable for use in the invention as shown in cross-section in FIG. 2. The important features are an inlet (20) and outlet (21) and a diaphragm (24). The diaphragm is urged against a seat (25) by a spring (22) whose compression may be adjusted by an adjusting screw (23). This arrangement allows one to modify the back-pressure independently of the flow rate as discussed above. An example is Milton Roy Model VB1-651-200.

Typical ranges for process parameters include:

Flow: 0.1 to 100 kg/min (+/−0.05 kg/min)

Pressure: 1 to 18 atm (+/−0.5 atm)

Temperature: 100 C to 250 C (+/−5° C.)

Heat/Cool Rates: Minimum of 20° C./min (+/−5° C./min), and preferred 250°-500°/min (+/−5° C./min)

While the invention has been particularly shown and described with reference to preferred embodiments thereof, it will be understood by those skilled in the art that other changes in form and details may be made therein without departing from the spirit and scope of the invention.

We claim:

1. An apparatus for forming dispersions of amorphous particles of photographically active materials in water comprising:
   (a) a diaphragm pump;
   (b) a first heat exchanger maintained at from 100° to 200° C.;
   (c) a second heat exchanger maintained below a glass transition temperature of said amorphous particles;
   (d) a spring-loaded back-pressure valve capable of generating a back pressure from 1 to 18 atmospheres; and
   (e) conduits connecting said diaphragm pump to said first heat exchanger, said first heat exchanger to said second heat exchanger and said heat exchanger to said valve.

2. An apparatus for forming amorphous particle dispersions in a fluid at elevated temperatures and elevated pressure in a continuous process comprising:
   (a) pump means capable of pumping a fluid against pressure higher than atmospheric pressure;
   (b) a means for continuously changing the temperature of said fluid, initially to a temperature above its boiling point at atmospheric pressure and then to a temperature below its boiling point at atmospheric pressure;
   (c) means for generating back-pressure sufficient to maintain said fluid in a liquid state throughout said means for changing the temperature of said fluid; and
   (d) a first conduit for delivering said fluid from said pump means to said means for changing temperature and a second conduit for delivering said fluid from said means for changing the temperature to said means for generating back pressure.

3. An apparatus according to claim 2 wherein the temperature of a particle in said fluid within said means for continuously changing temperature has a heat/cool rate exceeding 20° C./min when the temperature of the particle in said fluid is above the glass transition temperature of said particle during passage through said means for changing temperature.

4. An apparatus according to claim 2 for forming amorphous particle dispersions in a fluid at elevated temperatures and elevated pressure in a continuous process wherein
   said means for continuously changing the temperature of said fluid comprises a first heat exchange device for supplying sufficient heat to raise the temperature of said fluid above its boiling point at atmospheric pressure and a second heat exchange device for removing heat from said fluid to lower the temperature of said fluid from above its boiling point at atmospheric pressure to below its boiling point at atmospheric pressure; and further comprising
   a connection means for conveying fluid from said first heat exchange device to said second heat exchange device, wherein the heat/cool rate exceeds 20° C./min when the temperature of a particle in said fluid is above a glass transition temperature of said particle during passage through said first heat exchange device, said connection and said second heat exchange device.

5. An apparatus according to claim 4 wherein said heat/cool rate is between 250°-500° C./min.

6. An apparatus according to claim 4 further comprising pulse dampening means disposed downstream of said pump.

7. An apparatus according to claim 4 wherein said fluid is water, said temperature of said first heat exchange device is from 100° to 200° C., said second heat exchange device is below 100° C. and back-pressure is maintained between 1.0 and 18 atmospheres.

8. An apparatus according to claim 7 wherein said pump means is a diaphragm pump.

9. An apparatus according to claim 8 wherein said means for generating back-pressure is a spring-loaded back-pressure valve.

10. An apparatus according to claim 9 wherein said second heat exchanger removes sufficient heat to lower the temperature of said fluid below a glass transition temperature of said particles.

* * * * *